No. 854,148. PATENTED MAY 21, 1907.
F. L. CLARK & W. V. TURNER.
FLUID PRESSURE BRAKE.
APPLICATION FILED AUG. 11, 1904.

2 SHEETS—SHEET 1.

WITNESSES
J. Custer
Jas. B. MacDonald

INVENTORS
Francis L. Clark
Walter V. Turner
by E. Wright Att'y.

No. 854,148. PATENTED MAY 21, 1907.
F. L. CLARK & W. V. TURNER.
FLUID PRESSURE BRAKE.
APPLICATION FILED AUG. 11, 1904.

2 SHEETS—SHEET 2.

WITNESSES
J. S. Custer
Jas. B. MacDonald

INVENTORS
Francis L. Clark
Walter V. Turner
by E. Wright
Att'y.

THE NORRIS PETERS CO., WASHINGTON, D. C.

UNITED STATES PATENT OFFICE.

FRANCIS L. CLARK, OF PITTSBURG, AND WALTER V. TURNER, OF WILKINS-BURG, PENNSYLVANIA, ASSIGNORS TO THE WESTINGHOUSE AIR BRAKE COMPANY, OF PITTSBURG, PENNSYLVANIA, A CORPORATION OF PENNSYLVANIA.

FLUID-PRESSURE BRAKE.

No. 854,148.     Specification of Letters Patent.     Patented May 21, 1907.

Application filed August 11, 1904. Serial No. 220,442.

*To all whom it may concern:*

Be it known that we, FRANCIS L. CLARK and WALTER V. TURNER, citizens of the United States, residing, respectively, in Pittsburg and Wilkinsburg, both in the county of Allegheny and State of Pennsylvania, have invented a certain new and useful Improvement in Fluid-Pressure Brakes, of which the following is a specification.

This invention relates to fluid pressure brakes and more particularly to brake apparatus adapted to be adjusted for light braking on empty cars and for heavy braking on loaded cars. Various forms of load brake apparatus have been proposed for this purpose, such as a reducing valve for limiting the pressure admitted to the brake cylinder on empty cars, or a blow down or safety valve for reducing the brake cylinder pressure, or an additional reservoir, or an additional brake cylinder, and a cock or valve device operated either manually or automatically for adjusting said apparatus to give either light braking power or heavy braking power according to which position the cock or valve may be set. In order to prevent a brake apparatus of this character from being left adjusted to the heavy braking position after a car has been unloaded, it is desirable that it should be automatically returned to light braking position at that time or before the brakes are again applied on that particular car, for otherwise the braking force would be too great for the weight of the empty car and would cause danger of injury by the sliding of the wheels. In practically all cases of unloading heavy cars, these are disconnected from the train or locomotive and left standing on a siding for a longer or shorter period of time sufficient for the compressed air of the air brake system to leak away.

The principal object of our invention, therefore, is to provide improved means operated by the air or fluid pressure in the system for automatically adjusting the apparatus to light braking position.

Figure 1:
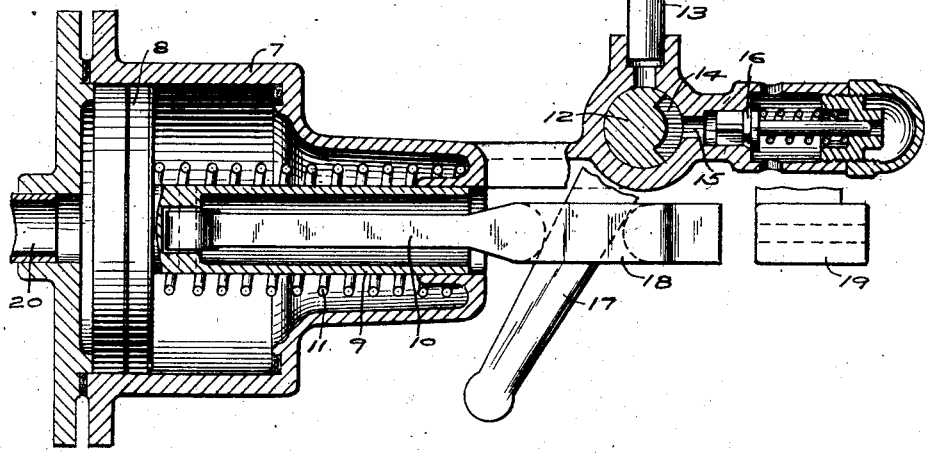
Figure 2:
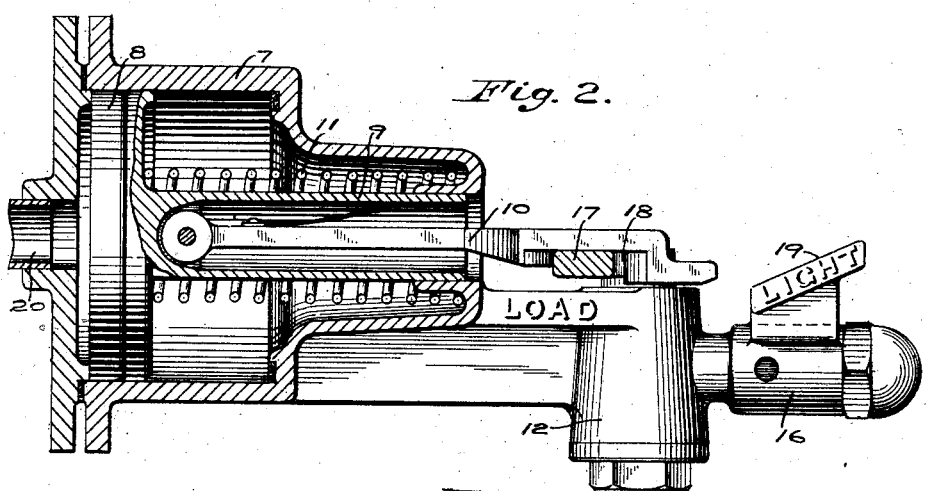
Figure 3:
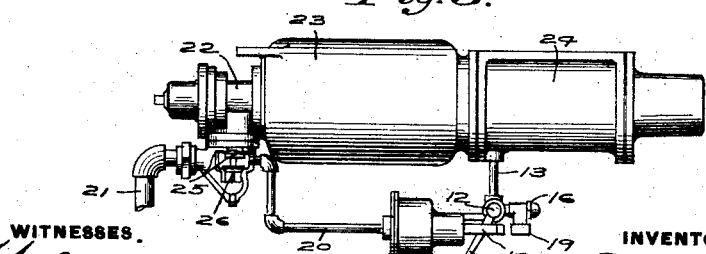
Figure 4:
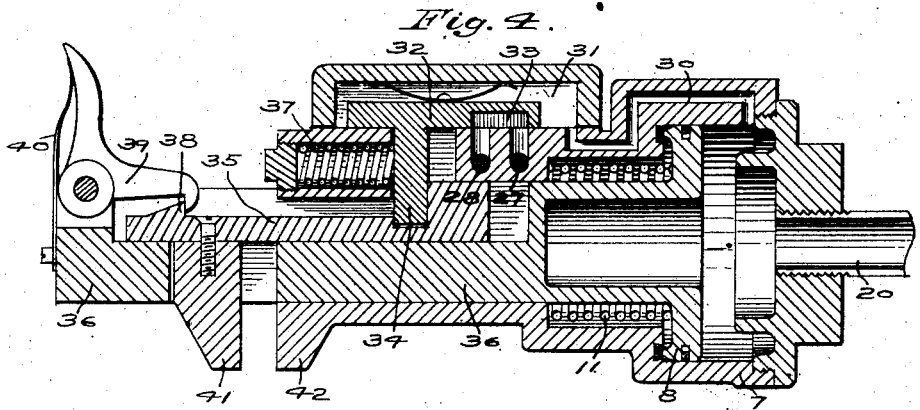
Figure 5:
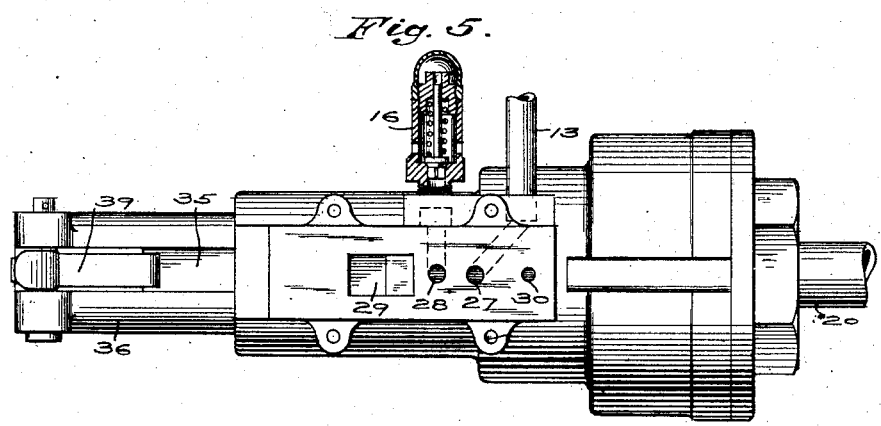
Figure 6:
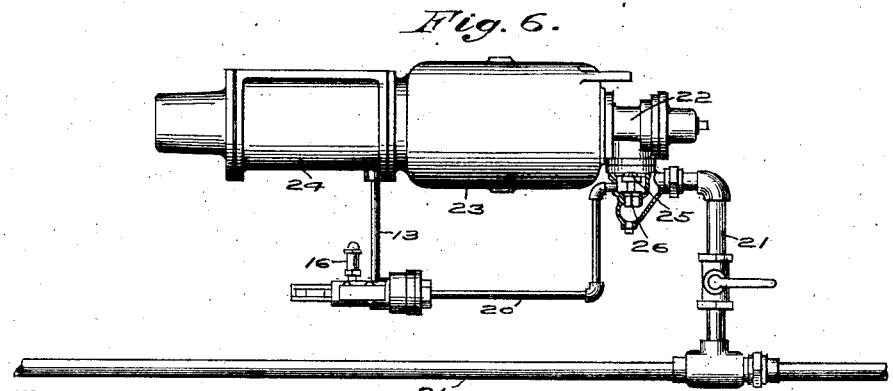

In the accompanying drawings, Figure 1 is a horizontal section showing one form of device embodying our improvements; Fig. 2 a vertical section of the same; Fig. 3 a diagram in elevation showing our improved device connected to the brake cylinder and train pipe; Fig. 4 a vertical section showing a modification having a slide valve; Fig. 5 a plan view of the same showing the slide valve seat with the valve and cover removed; and Fig. 6 a diagram showing the modified form of device connected up to the train pipe and brake cylinder.

According to the construction shown on Sheet 1 of the drawings, the cock or valve for adjusting the apparatus for either light braking or heavy braking is represented by a plug cock 12 having handle 17 and port 14 for controlling communication from pipe 13 and from the brake cylinder 24 to the port 15 and the blow down or safety valve 16. It will be evident that any other form of apparatus for securing light braking pressure upon empty cars and heavy braking on loaded cars may be used, if desired. This cock is preferably operated by means of a cylinder 7 containing piston 8, rod 9, spring 11 and a pivoted push bar 10 having a slot or recess 18 for engaging the handle 17 of the cock. An inclined cam surface is located near the end of this bar for engaging the same, and the cylinder 7 is connected to the train pipe 21 preferably at a point between the emergency valve 25 and check valve 26 of the standard Westinghouse quick action triple valve 22. The operation of this form of our improvement is as follows:—When a train is coupled up and the train pipe is charged up with compressed air from the main reservoir, the air also flows through pipe 20 into the cylinder 7 and forces the piston 8 over to its outer position seated upon a gasket, compressing spring 11 and moving the bar 10 to the outer or light braking position. If the cock handle is in its load position for heavy braking, as indicated in the drawing, the cock will be adjusted to light position by the movement of the bar so that all the cocks will be automatically set to light braking position when the train pipe is first charged up. During the last part of the outward movement of the piston rod the outer end of the bar 10 rides up on the inclined surface 19, thereby raising the end of the bar so that the handle 17 is free from the notch 18. The cocks on the loaded cars may then be manually adjusted to the load position for heavy braking in which the port or pipe 13 leading from the brake cylinder is cut off from the safety valve and the entire pressure admitted to the brake cylinder at each application of the brakes is retained in the brake cylinder thereby producing the maximum braking power upon the heavily loaded cars. When a car is to be unloaded it is ordinarily set out upon a siding or detached from the train for a sufficient length of time to permit the compressed air to entirely leak out of the brake system. When the train pipe pressure is thus depleted to such a point as to be less than the force of the spring 11 the piston 8 is returned to its first position, as indicated in the drawing. If the cock handle is set in the load position at this time the bar 10 will be merely drawn over the handle until it reaches its inner position where the lever is again engaged by the notch in the bar. If the cock handle is in light position at the time that the train pipe is depleted, the notch in the bar 10 will engage the lever and automatically set the cock back to its load position. It will be seen, therefore, that all cocks that are not set in load position will be automatically returned to that position when the train pipe pressure is thus depleted or when the pressure leaks off the brake system of the car. Then when the cars are again coupled in the train and the train pipe charged up, all the cocks will be adjusted to the light braking position as before described, in which the brake cylinder communicates with the safety valve through pipe 13, port 14 and port 15. The spring of the safety or blow down valve is set to the maximum pressure that it is desired to retain in the brake cylinder for light braking when the car is empty, which is much less than that admitted to the brake cylinder in full service applications. It will now be apparent that, by means of this construction, if any cock should be left in load position for heavy braking after the car is unloaded, it will be automatically returned to light braking position when the brake system of the car is again charged up with air and any injurious effects from excessive braking pressure and sliding wheels on empty cars will be avoided.

According to the form of device illustrated on Sheet 2 of the drawings, the valve is shown as a slide valve 32 operating in chamber 31 and having a cavity 33 for controlling communication from the brake cylinder pipe 13 and port 27 to port 28 leading to the safety or blow down valve 16. The valve chamber communicates with the train pipe or cylinder 7 through port 30 for admitting train pipe air to hold the slide valve on its seat and the valve is provided with a projection 34 extending down through an opening in the valve seat and into a recess in the sliding piece 35 which is mounted in a slot or groove in the piston rod 36. A coiled spring 37 is mounted in the casing and bears against the slide valve for normally shifting the same to its heavy load position. At the outer end of the rod 36 is pivoted a latch 39 having a spring 40 adapted to hold the latch in engagement with a notch or projection 38 upon the sliding piece 35, for adjusting the position of the valve. Projections 41 and 42 may be used, if desired, to show at a glance by their relative positions what position the slide valve is in.

When the system is charged with air under pressure the piston 8 is forced over against its gasket in the position shown in Fig. 4, the latch lever 39 engaging the notch of the sliding piece 35 and holding the sliding valve in its light braking position with the cavity 33 connecting ports 27 and 28. The device on the loaded cars may then be manually adjusted for heavy braking by merely raising the latch lever and releasing the sliding piece 35, whereupon the spring 37 immediately moves the slide valve to load position and cuts off communication from the brake cylinder to the safety valve through ports 27 and 28.

When the loaded car is detached for the purpose of unloading, the compressed air in the train pipe leaks away and the spring 11 returns the piston and rod to its inner position, in which the latch lever hooks into the notch of the sliding piece 35. Then when the car is again coupled up in a train and the train pipe charged with compressed air, the piston 8 moves to its outer position against the gasket and adjusts the valve to its light braking position, as above explained.

Various other modifications may be devised within the scope of this invention for automatically adjusting a light and load brake apparatus to its position for light braking when the system is depleted of air pressure and again charged up.

Having now described our invention, what we claim as new and desire to secure by Letters Patent is:—

1. In a fluid pressure brake, the combination with an apparatus adapted to be adjusted to a light braking position or to a heavy braking position, of means operated by the train-pipe pressure of the system for automatically setting the apparatus to its light braking position.

2. In a fluid pressure brake, the combination with an apparatus adapted to be adjusted to give light braking power on empty cars and heavy braking power on loaded cars, of means operated by charging up the train pipe for automatically setting the apparatus in light braking position.

3. In a fluid pressure brake, the combination with an apparatus adapted to be adjusted to give light braking power on empty cars and heavy braking power on loaded cars, of means operating upon a depletion of fluid pressure in the apparatus for automatically setting the device in heavy braking position, and means operated by again charging or increasing the pressure for adjusting the apparatus to its light braking position.

4. In a fluid pressure brake, the combination with an apparatus for giving either light braking power or heavy braking power, of a valve device subject to the fluid pressure of the system for adjusting said apparatus, and means for moving said valve device to heavy braking position when the pressure is depleted and to light braking position when the system is recharged.

5. In a fluid pressure brake, the combination with an apparatus for giving either light braking power or heavy braking power, of a valve for adjusting said apparatus and a movable abutment for actuating said valve and normally subject to the fluid pressure of the system when the valve is in light braking position.

6. In a fluid pressure brake, the combination with an apparatus adapted to be adjusted to give light braking power on empty cars and heavy braking power on loaded cars, said apparatus including a cock or valve for adjusting the same, of a piston subject to the fluid pressure of the system for automatically adjusting the position of the cock, and means for manually adjusting the position of the cock at any time, independently of the piston.

7. In a fluid pressure brake, the combination with an apparatus adapted to be adjusted to give light braking power on empty cars and heavy braking power on loaded cars, said apparatus including a cock or valve for adjusting the same, of a piston actuated by the charging up of the system with fluid under pressure for automatically adjusting the cock to its light braking position, and a spring for returning the piston to its opposite position when the pressure in the system is depleted.

8. In a fluid pressure brake, the combination with an apparatus having a cock or valve adapted to be adjusted to one position for producing heavy braking power on the car when loaded and when set in another position to produce light braking power for the car when empty, of a piston and pivoted bar operated by the increase of train pipe pressure for automatically adjusting said cock to its light braking position.

9. In a fluid pressure brake, the combination with an apparatus having a cock or valve adapted to be adjusted to one position for producing heavy braking power on the car when loaded and when set in another position to produce light braking power for the car when empty, of a piston subject to the fluid pressure of the system, a bar pivoted to the piston and having a notch for engaging the cock lever, and means for raising the bar out of engagement with the cock lever in light braking position.

10. In a fluid pressure brake, the combination with a train pipe, auxiliary reservoir, brake cylinder and triple valve device having an emergency valve and check valve, of an apparatus adapted to be adjusted for light braking power on empty cars and heavy braking power on loaded cars, a movable abutment for adjusting said apparatus, and a pipe or passage leading from the check-valve chamber of the triple valve device to said abutment.

In testimony whereof we have hereunto set our hands.

FRANCIS L. CLARK.
WALTER V. TURNER.

Witnesses:
R. F. EMERY,
JAS. B. MACDONALD.